United States Patent [19]
Dalton

[11] 3,726,543
[45] Apr. 10, 1973

[54] ASSIST MECHANISM FOR FOLD-UP LANDING GEAR

[75] Inventor: Thomas B. Dalton, Muskegon, Mich.

[73] Assignee: Westran Corporation, Muskegon, Mich.

[22] Filed: Jan. 29, 1971

[21] Appl. No.: 110,837

[52] U.S. Cl. ............................................. 280/150.5
[51] Int. Cl. ............................................... B60s 9/02
[58] Field of Search .......................... 280/150.5, 475; 254/86 R, 86 H; 267/74, 174; 49/386

[56] References Cited

UNITED STATES PATENTS

| | | | |
|---|---|---|---|
| 1,946,984 | 2/1934 | Nicholson | ...............................254/86 |
| 1,857,611 | 5/1932 | Swift | ..................................280/150.5 |
| 2,863,670 | 12/1958 | Larson | ...............................280/150.5 |
| 3,104,891 | 9/1963 | Dalton | ...............................280/150.5 |

*Primary Examiner*—Benjamin Hersh
*Assistant Examiner*—Robert R. Song
*Attorney*—Hauke, Gifford and Patalidis

[57] ABSTRACT

An assist mechanism for a trailer landing gear, the landing gear being of the type having a pair of legs secured to opposite sides of the forward portion of a trailer to support the trailer and each of the legs being capable of being folded beneath the trailer. The mechanism comprises an assist spring for each leg having one end secured to a fixed support beneath the trailer body and the other end secured to a chain, which passes over a sprocket and is connected with the leg of the landing gear. The sprocket is eccentrically mounted to permit the spring to exert the most pulling force on the leg during the latter portion of its pivoting to the folded-up position.

4 Claims, 4 Drawing Figures

PATENTED APR 10 1973　　　3,726,543

INVENTOR
THOMAS B. DALTON
BY
Hauke Gifford & Patalidis
Attorneys

PATENTED APR 10 1973 3,726,543

INVENTOR
THOMAS B. DALTON
BY
Attorneys

ASSIST MECHANISM FOR FOLD-UP LANDING GEAR

BACKGROUND OF THE INVENTION

1. Field of the Invention

The invention relates broadly to fold-up landing gear for trailers or similar vehicles, and more particularly to an assist mechanism which aids in folding-up the landing gear.

2. Description of the Prior Art

Heretofore, fold-up landing gears have normally utilized a tension spring that has one end pivotally mounted to a fixed support beneath the trailer body and which extends diagonally downwardly therefrom, with its other end pivotally mounted to the landing gear leg to aid in folding-up the leg. The leg is manually pushed to the fold-up position where it is latched in place. The spring is provided simply to aid in moving the heavy leg upwardly to the fold-up position. In such an assembly, the spring extends diagonally downwardly between the trailer and the leg during normal use and thus provides an unnecessary obstruction and positions the spring mechanism where it is susceptible to damage. Furthermore, as the landing gear leg is folded upwardly, the spring contracts, reducing its pulling force during the last several degrees of the fold-up, where the spring assist is needed most. Also, as the leg is folded-up, the angle of pull between the spring and leg becomes very small during the last several degrees of fold-up, further reducing the effectiveness of the assist spring.

SUMMARY OF THE INVENTION

The assist mechanism of the present invention comprises a tension spring provided for each of the landing gear legs. Each of the springs has one end mounted to a fixed support beneath the trailer body and extends outwardly therefrom with its outer end secured to a chain. The chain passes over a sprocket and is connected with one of the legs of the landing gear. The sprocket is rotatably mounted but the axis of rotation is offset from the center of the sprocket in a manner which provides rotation of the sprocket toward an over-center position as the leg is moved toward a folded-up position. The over-center position is achieved as the leg nears the folded-up position and the force of the spring thereupon increases to pull the leg upwardly the remainder of the way. The construction permits the spring to be maintained in a horizontal protected position even when the landing gear legs are in an extended ground engaging position.

DESCRIPTION OF THE DRAWINGS

A better understanding of the present invention will be apparent upon reference to the following description. The description refers to the accompanying drawings in which like reference characters refer to like parts throughout the several views and in which.

DESCRIPTION OF THE PREFERRED EMBODIMENT

Figure 1:
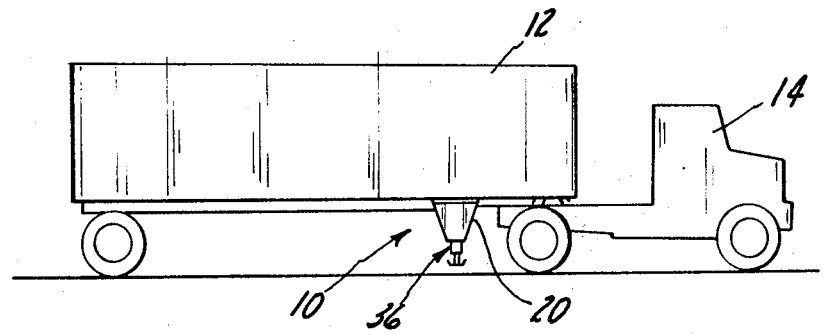
FIG. 1 is a side elevational view of a conventional tractor and trailer utilizing a landing gear incorporating the assist mechanism of the present invention.

Referring to FIG. 1, a landing gear utilizing the assist mechanism of the present invention, generally indicated at 10, is shown connected to the forward portion of a trailer 12 immediately to the rear of the portion of the trailer 12 which is pivotally connected to the rear end of a tractor 14. The landing gear 10 is shown in the unfolded position out of contact with the pavement. In this position, the tractor 14 may pull the trailer 12 to its destination. Upon reaching the destination, the landing gear is cranked down to an extended position such that the trailer 12 may be detached from the tractor 14 with the forward portion of the trailer 12 resting upon the landing gear 10.

Figure 2:
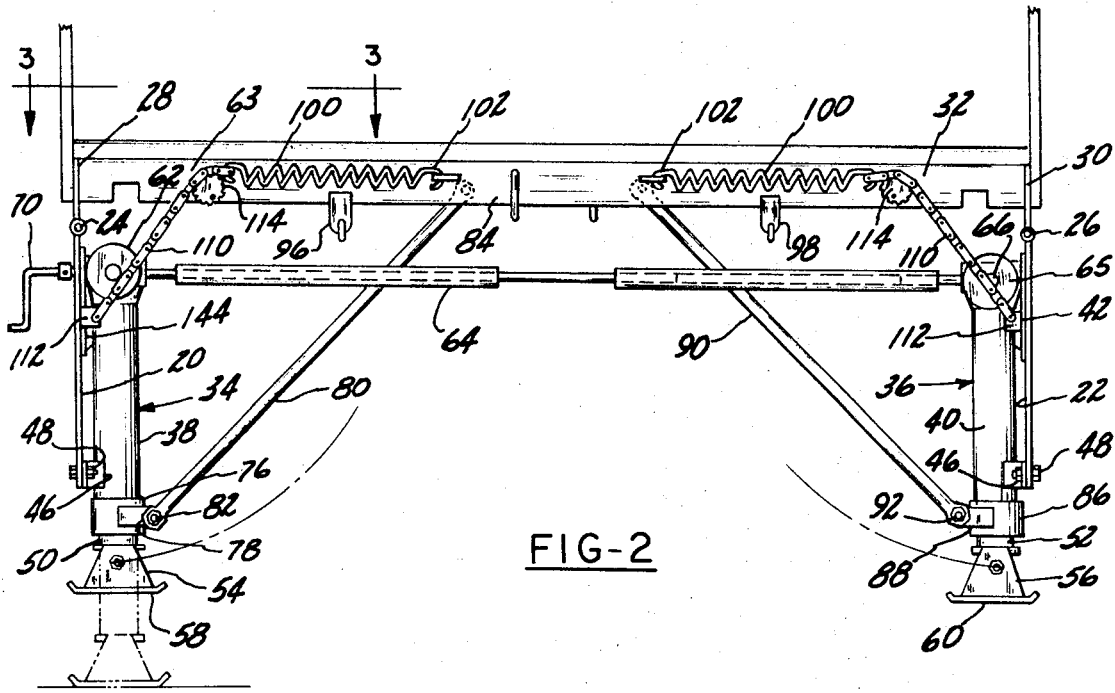
FIG. 2 is a front elevational view of a landing gear utilizing the assist mechanism of the present invention.

Referring to FIG. 2, the fold-up landing gear 10, utilizing the assist mechanism of the present invention includes a pair of outer plates 20 and 22 secured along their top edge by means of piano hinges 24 and 26, respectively, to a pair of plates 28 and 30, respectively. The plates 28 and 30 are mounted to opposite sides of the front portion of the trailer frame 32 for pivotally mounting the two outer plates 20 and 22 thereto. Landing gear legs 34 and 36 are secured to the inner surface of the plates 20 and 22, respectively. The legs 34 and 36 include outer housings 38 and 40, respectively, having their upper ends secured to flat rectangular plates 42 and 44, respectively, which are secured by any convenient means to the inner surfaces of the plates 20 and 22, respectively. The housings 38 and 40 each include a pair of tabs as at 46 having one end secured to the respective housing as by welding, bonding or the like and the other end secured to the lower portion of one of the plates 20 or 22 by means of a bolt and nut 48. Thus, the outer housings 38 and 40 are securely mounted to the inner surface of the plates 20 and 22, respectively.

Elongated tubular members 50 and 52 are slidably received in the lower end of the tubular housings 38 and 40, respectively, and a landing gear foot, generally indicated at 54 and 56 respectively is provided at the lower end of each of the members 50 and 52 for engaging the ground to support the forward portion of the trailer. Each landing gear foot 54 and 56 preferably includes a generally flat rectangular ground engaging member 58 and 60, respectively, pivotally mounted to the lower end of the members 50 and 52. It will be understood that the landing gear feet 54 and 56 may be of any other conventional design, such as roller, caster or the like for engaging the ground.

The tubular members 50 and 52 are slidably mounted within the housings 38 and 40, respectively, between a retracted position and an extended position wherein the landing gear feet engage the ground to support the forward portion of the trailer 12. Each of the housings 38 and 40 and the members 50 and 52 have conventional mechanical gearing disposed therein for raising and lowering the tubular members 50 and 52.

Still referring to FIG. 2, a gear box 62 is pivotally mounted to the inner surface of the plate 20 by means of a bracket (not shown). The gear box 62 is connected into the gear mechanism disposed within the upper end of the housing 38 by means of a shaft 63 for raising and lowering the member 50. A telescoping shaft 64 connects the gear box 62 to a similar gear box 65 which is pivotally mounted to the inner surface of the plate 22 by means of a bracket (not shown). The gear box 65 is connected to the gear mechanism disposed within the upper end of the housing 40 by means of a shaft 66 for raising and lowering the member 52. A shaft 68 extends from the upper end of the housing 38 through the plate 20 for engagement by a manual crank 70 to raise and lower the landing gear legs. The rotation of the shaft 68 raises and lowers the member 50 and, simultaneously, through the gear boxes 62 and 65 and the shaft 64, raises and lowers the member 52. Thus, as the crank 70 is manually turned, both of the landing gear legs are simultaneously raised or lowered depending upon the direction of rotation of the crank 70.

Still referring to FIG. 2, an annular bracket 76 encompasses the lower end of the tubular housing 38 and is secured in place by welding, bonding or the like and a tab 78 extends outwardly from the bracket and an elongated brace 80 has one end pivotally mounted to the end of the tab 78 by means of a bolt and nut 82 and extends upwardly and inwardly therefrom with the other end pivotally mounted to a roller (not shown). The roller is mounted in an inwardly facing U-shaped channel member 84 which extends between the two plates 28 and 30 and is secured thereto as by welding, bonding or the like, immediately beneath the trailer frame 32. The channel member 84 may also be secured to the bottom surface of the trailer frame 32 as by welding, bonding or the like. When the leg 34 is in its unfolded vertical position, the upper end of the brace 80 is fixedly secured to the channel member 84, securing the leg 34 in its unfolded position.

A similar bracket 86 is mounted to the housing 40 and includes a tab 88 extending outwardly therefrom. A second elongated brace 90 extends upwardly and inwardly from the tab 88 and has one end pivotally secured as by a nut and bolt 92. The other end of the brace 90 is pivotally secured to a roller (not shown), which is mounted in U-shaped channel member 84 horizontally spaced from the end of the brace 80 in its own channel (not shown) separated from the channel carrying the end of the brace 80. When the leg 36 is in its unfolded vertical position, the upper end of the brace 90 is fixedly secured in the channel member 84 securing the leg 36 in its unfolded position. When it is desired to fold the legs 34 and 36 to their folded-up positions beneath the semi-trailer 12, the upper ends of the braces 80 and 90 are released and allowed to roll along the channel member 84 toward each other, folding the legs 34 and 36 upwardly to their substantially horizontal position beneath the trailer 12. Once in the folded-up position, the legs 34 and 36 are locked in position by the locking mechanisms 96 and 98.

The construction of the landing gear 10 as it has been described to this point is just an example of a type of landing gear that can utilize the assist mechanism of the present invention. The landing gear 10, which has been described is the basis of a patent application Ser. No. 96541, filed Dec. 9, 1970 now U.S. Pat. No. 3,658,359, by the assignee of the present application and reference can be had to that application for a better understanding of the operation of the landing gear 10.

Figure 3:
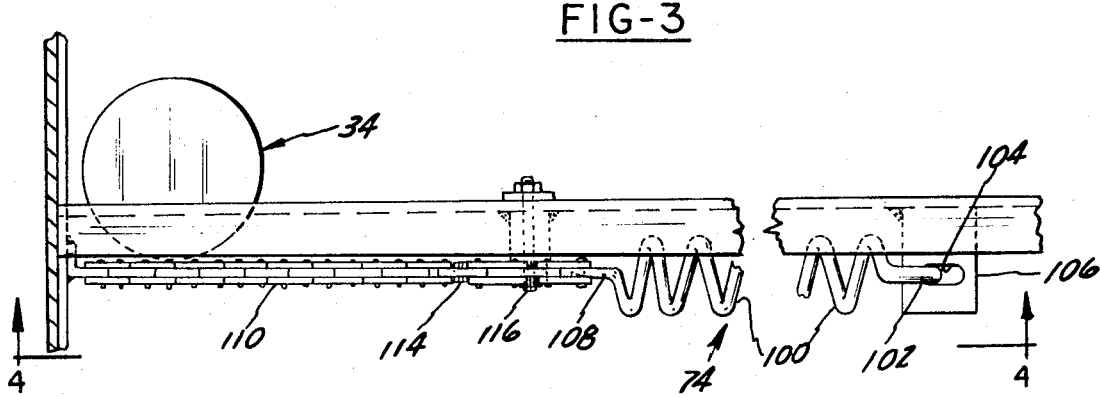
FIG. 3 is a top view of the assist mechanism of the present invention taken along line 3-3 of FIG. 2 and enlarged somewhat for purposes of clarity.
Figure 4:
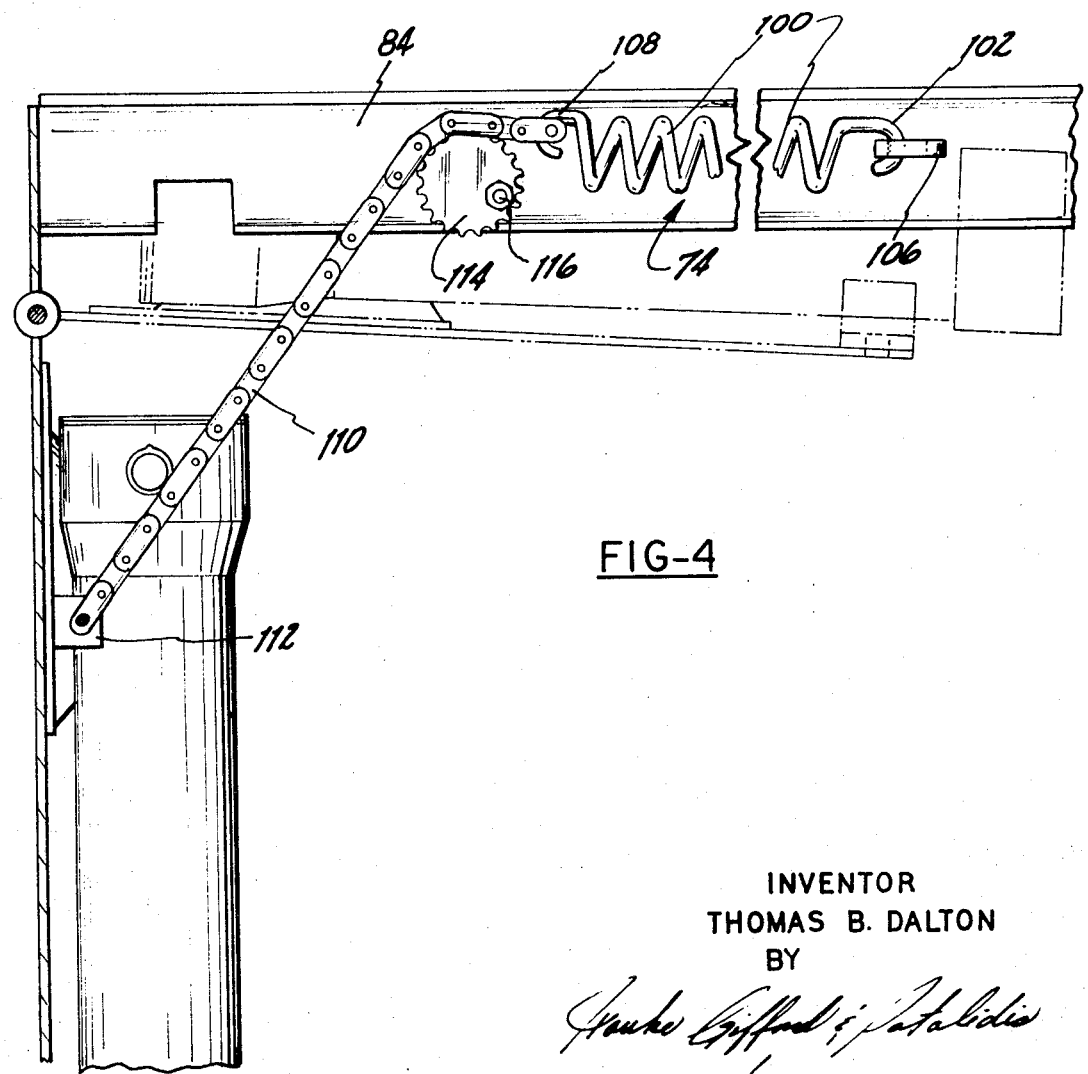
FIG. 4 is an elevational view taken substantially along line 4—4 of FIG. 3.

An assist mechanism 74 is provided on both sides of the landing gear 10 for aiding in folding-up the legs 34 and 36. Referring to FIGS. 2-4, the assist mechanism 74 for folding-up the leg 34 only will be described, it being understood that the assist mechanism 74 for the leg 36 is the same. The assist mechanism 74 includes a tension spring 100 having a hook end 102 mounted in an aperture 104 (FIG. 3) formed adjacent the outer free end of a tab 106 that has its inner end secured to the outer surface of the mid-portion of the channel member 84 as by welding, bonding or the like. AS can best be seen in FIGS. 3 and 4, the tension spring 100 has a hook 108 on its opposite end which is connected to the end of a chain 110.

The opposite end of the chain 110 is pivotally mounted to a bracket 112 carried by the plate 20. The chain 110 passes over a sprocket 114, which as best can be seen in FIG. 4 is rotatable about an axis 116 which is offset from the center of the sprocket 114. The eccentric mounting of the sprocket 114 produces a mechanism in which the force of the spring 100 acting through the chain 110 on the landing gear leg 34 does not decrease as the leg 34 moves near the folded-up position. As the leg moves toward the folded-up position, the sprocket 114 is rotated toward an over-center position. The over-center position is achieved when the sprocket 114 is positioned such that a line passing through the axis 116 and dividing the sprocket 114 into two equal parts extends vertically. Once the sprocket 114 is rotated past the over-center position, the force of the spring 100 is multiplied so that instead of diminishing, the force acting upon the leg 34 as the spring 100 compresses is actually increased and the leg 34 will be pulled by the spring 100 the remainder of the way to the folded-up position.

Thus, the spring 100 is most effective as an assist mechanism during the last several degrees of the fold-up operation, where an assist mechanism is needed most. This means that the leg 34 can be given a hard push and if the push is sufficient to bring the leg adjacent the folded-up position the spring 100 will be effective to move it the rest of the way.

Furthermore, the spring 100 does not extend downwardly adjacent the inside of the housing 38 where it may be damaged or get in the way of the operation of the rest of the landing gear mechanism, but is, instead, disposed out of the way of the rest of the landing gear mechanism.

It will be understood that although the assist mechanism 74 is illustrated as used with a landing gear 10 that folds inwardly under the trailer frame 32, the mechanism 74 may also be used with other types of fold-up landing gear, such as a radial fold-up type that pivots about an axis transverse to the axis of elongation of the trailer.

Although I have described but one preferred embodiment of my invention, it is to be understood that various changes and revisions can be made therein without departing from the spirit of the invention or the scope of the appended claims.

I claim:

1. In combination with a trailer body having a pair of landing gear legs pivotally attached to opposite sides of the trailer body and movable between unfolded and folded up positions, an assist mechanism for use with each leg said mechanism comprising:

a tension spring having a first end secured to said trailer body, an elongated member having one end mounted to said landing gear at a point spaced from the point of attachment between said landing gear leg and said trailer body and an opposite end mounted to said spring to urge said landing gear toward the folded-up position; and a take-up member pivotally mounted to said trailer body and operatively connected to said elongated member intermediate said spring and said landing gear leg;

said take-up member being eccentrically mounted and being pivotal from a first position associated with the unfolded position of said landing gear leg past an over-center position to a second position associated with the folded-up position of said landing gear leg whereby movement of said take-up member past said over center position tends to shorten the effective length of said elongated member to thereby increase the effect of the spring in assisting the landing gear leg to a folded up position.

2. The combination as defined in claim 1 and in which said elongated member comprises a chain and said take-up member comprises a sprocket, said sprocket being pivotal on an axis spaced from the center of said sprocket.

3. The combination as defined in claim 1 and in which said spring is mounted in a substantially horizontal position throughout movement of said landing gear leg.

4. In combination with a trailer body having a pair of landing gear legs pivotally attached to opposite sides of said body and movable between an unfolded and a folded up position, an assist mechanism for use with each leg, said mechanism comprising:

a tension spring having a first end secured to said trailer body;

a chain having a first end mounted to said leg and a second end mounted to the free end of said spring to urge said landing gear toward the folded up position; and a sprocket mounted to said trailer body and engaging with said chain, said sprocket having a center and being pivotal on an axis spaced from its center and being mounted to pivot past an over-center position as said landing gear leg is moved toward the folded up position so that the effective length of said chain is shortened and the effective force of said spring is increased as said landing gear leg nears said folded up position.

* * * * *